July 8, 1924.
J. W. HOBBS
1,500,816
CABLE EQUALIZER FOR ELEVATORS AND THE LIKE
Filed July 23, 1923    2 Sheets-Sheet 2
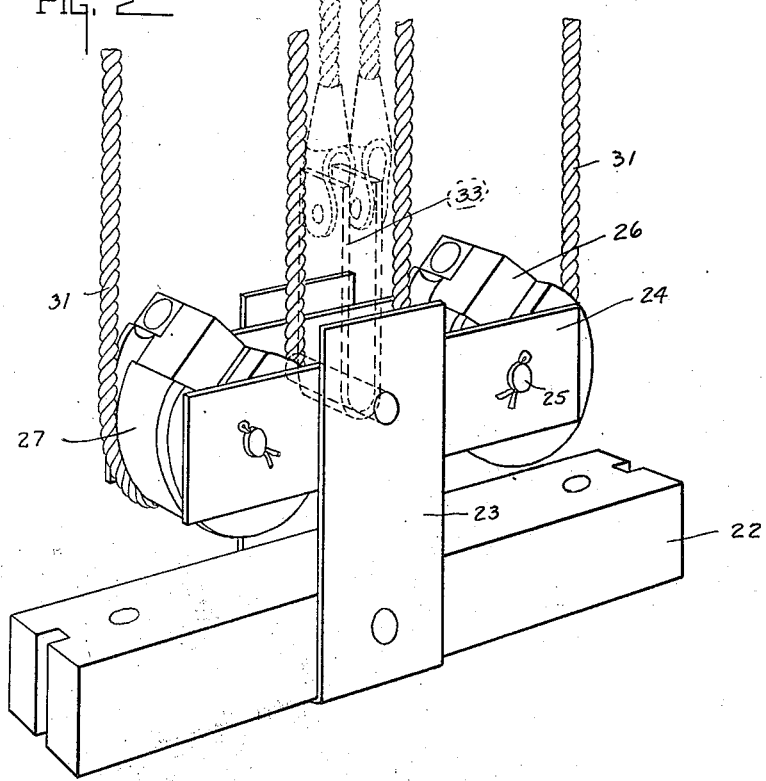
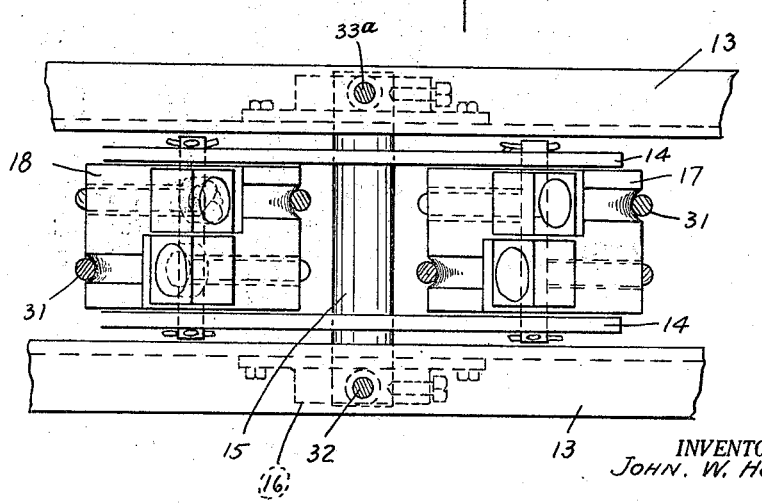
INVENTOR.
JOHN. W. HOBBS.
BY
*[signature]*
ATTORNEYS.

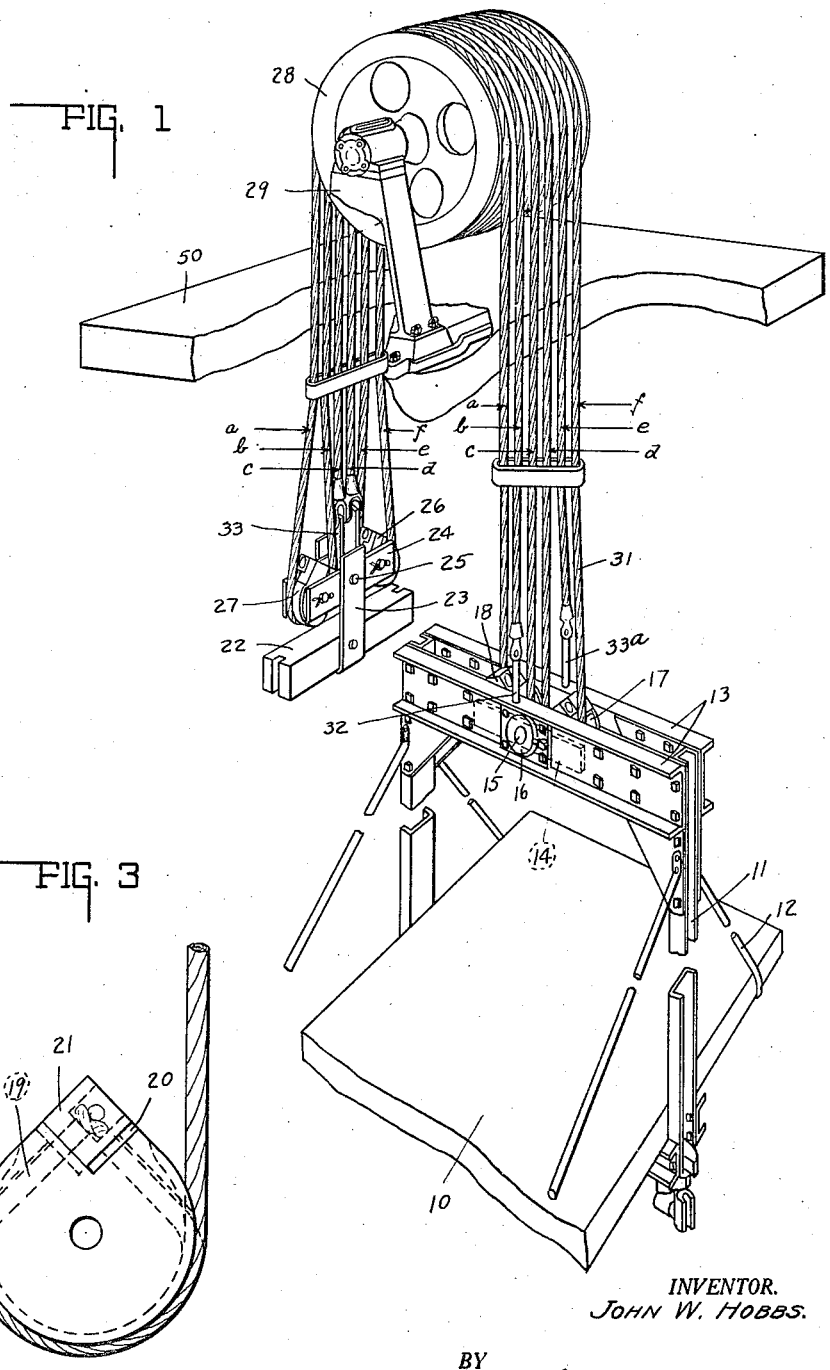

Patented July 8, 1924.

1,500,816

UNITED STATES PATENT OFFICE.

JOHN W. HOBBS, OF INDIANAPOLIS, INDIANA, ASSIGNOR TO THE HOME ELEVATOR COMPANY, OF INDIANAPOLIS, INDIANA.

CABLE EQUALIZER FOR ELEVATORS AND THE LIKE.

Application filed July 23, 1923. Serial No. 653,281.

*To all whom it may concern:*

Be it known that I, JOHN W. HOBBS, a citizen of the United States, and a resident of Indianapolis, county of Marion, and State of Indiana, have invented a certain new and useful Cable Equalizer for Elevators and the like; and I do hereby declare that the following is a full, clear, and exact description thereof, reference being had to the accompanying drawings, in which like numerals refer to like parts.

This invention relates to the arrangement of the supporting cables for an elevator or the like, and particularly to the connections for properly equalizing the same and causing the weight of the elevator to be equally distributed between the several cables.

The more common means of arranging a plurality of cables is to secure their respective ends more or less directly to the elevator and the counter-balance weights and adjust each of the cables independently to equalize them and cause the weight to be equally distributed among them. This is a tedious and unsatisfactory means of equalizing the cables and a number of more or less complicated arrangements have been devised for accomplishing the desired result. However, such equalizing devices have not proven entirely satisfactory, some because of the complicated mechanism and others because of the fact that the cables were not connected independently of each other so that where one would break or come unfastened, the whole structure would be affected.

It is the object of this invention to arrange a number of cables, four, six or more and provide equalizing means so that the weight will be equally distributed among the several cables, wherein each individual cable will be fixedly secured at both ends rather than be connected or form a part of one of the other cables. This arrangement is not only simple and economical in construction and installation, but although equalizing the distribution of weight, eliminates the weakness of one cable affecting the others.

The full nature of this invention will be understood from the accompanying drawings and the following description and claims.

In the drawings Fig. 1 is a perspective view showing the connection of the cables and the supporting structure, with parts broken away. Fig. 2 is a perspective view of the counter-balance weight and cable connection therewith. Fig. 3 is an end elevation of one of the connecting blocks. Fig. 4 is a plan view looking down on the cable connection with the elevator.

In the drawings there is shown an elevator 10 having a platform supported by the side channel irons 11 arranged to guide the elevator in its movement, there being a plurality of tie rods 12 connecting the channel irons 11 and the platform for bracing the same in the usual manner. The channel irons 11 are suspended from the cross beams 13 which are spaced apart by the channel irons 11. The balance bars 14 are mounted between the cross beams 13, being pivoted at their center thereto by the pin 15 supported by the bearing 16 positioned intermediated the ends of said cross beams 13. Between the balance bars 14 and adjacent each end thereof there is pivotally mounted the blocks 17 and 18 which are provided with peripheral grooves terminating in the hole or passage 19 through which the end of the cable may extend, said hole terminating in a cut-away portion 20 adapted to receive an anchor cup 21 for fixedly securing the end of the cable to the block after having passed partially about the periphery thereof.

The counter-weight 22 is supported by the U-shaped bracket 23 in which the counter-balance weights rest and are secured, and between the ends of which are pivotally mounted the balance bars 24, which are substantially the same as the balance bars 14. The pin 25 pivotally connects the balance bars at their center between the ends of the bracket 23. Between the bars 24 there are pivotally mounted the substantially annular blocks 26 and 27, which correspond to the blocks 17 and 18 respectively. The blocks 26 and 27 are constructed in the same manner as above described by the blocks 17 and 18 for receiving the cables about a portion of their periphery, the cables being secured thereto at their ends. The elevator and counter-weight are supported in the usual manner by the cable drum 28 rotatably supported by the supporting base 29 upon the floor of the building.

As shown herein, there are provided six supporting cables 31, said cables being respectively designated as cables A, B, C, D, E and F. Cable A has one end passing about a portion of the periphery of the block 27 from the outside and rigidly secured thereto on the inner side, said cable passing over a suitable groove in the drum 28 and having its other end passing about a portion of the periphery of the block 18 from the outer side and secured to the inner side thereof. Cable B has one end secured to the outer side of the block 27, passing about a portion of the periphery thereof from the inner side and over the drum 28 to the connecting pin 32, which is fixedly secured to one of the cross beams 13. The cables C and D are rigidly connected at one of their respective ends to a U-shaped supporting bar 33 which passes about the pin 25 for securing said cables thereto. The cable C has one end secured to said bar 33, passes over the drum 28 and about a portion of the periphery of the block 18 from the inner side and has its end connected with the outside thereof. The cable D has one end connected with the bar 33, passes over the drum and has the other end connected with the outer side of the block 17 after having passed about a portion of the periphery thereof from the inner side. The cable E has one end connected with the outer side of the block 26, passing about a portion of the periphery thereof over the drum 28 and having its other end connected with the connecting pin 33ª secured to the other cross beam 13. The cable F has one end passing about a portion of the periphery of the block 26 from the outer side and connected to the inner side thereof, and after passing over the drum 28 is connected to the inner side of the block 17 after passing about a portion thereof from the outer side. It will be noted, therefore, that while cables A and F have both ends connected with the blocks, cables B, C, D and E have one end connected with one of the blocks while the other end is directly connected with the elevator or weight rather than being connected therewith through one of said blocks. Therefore, at least one end of each cable is connected to a block so that any inequalities existing between the several cables may be taken up by a slight rotary movement thereof. At the same time any inequality between the cables connected with any one block and those connected with another would be taken up and equalized by the balance bars 14 and 24, and at the same time there is a direct connection made between four of the cables and the weights supported thereby.

The invention claimed is:

1. A cable equalizing attachment for elevators, comprising a pair of cross bars pivotally secured to the elevator intermediate their ends, a pair of blocks pivotally mounted between said bars on each side of their pivotal mounting, and a pair of cables adapted to pass partially about each of said blocks, one on each side thereof, said cables having their ends rigidly secured thereto whereby said blocks will act as an equalizing connection between each pair of cables.

2. A cable equalizing attachment for elevators, comprising a cross bar pivotally secured to the elevator, a block pivotally mounted on said bar, and a pair of cables adapted to pass partially about said block, one on each side thereof, said cables having their ends rigidly secured thereto, whereby said block will act as an equalizing connection between said cables.

3. A cable equalizing attachment for elevators, comprising a pair of blocks pivotally connected to said elevator, and a pair of cables adapted to pass partially about each of said blocks, one on each side thereof, said cables having their ends rigidly secured thereto whereby said blocks will act as an equalizing connection between each pair of cables.

4. A cable equalizing attachment for connecting the ends of the cable with an elevator and its counter-weight, comprising a pair of cross bars pivotally secured to said elevator, a pair of cross bars pivotally secured to said counter-weight, a pair of blocks pivotally mounted between each pair of cross bars on each side of their pivotal mountings, and a plurality of cables, each of said cables having at least one end passing partially about one of said blocks with its end rigidly secured thereto, each of said blocks acting as an equalizing connection between said cables.

5. A cable equalizing attachment for connecting the ends of the cable with an elevator and its counter-weight, comprising a pair of cross bars pivotally secured to said elevator, a pair of cross bars pivotally secured to said counter-weight, a pair of blocks pivotally mounted between each pair of cross bars on each side of their pivotal mountings, and a plurality of cables for connecting the elevator and counter-weight, two or more of said cables having one end directly connected with the elevator or counter-weight and the other end passing partially about one of said blocks and secured thereto, and the remaining cables having their respective ends passing partially about said blocks with their ends secured thereto and so arranged with respect thereto that said blocks will act as an equalizing connection between the individual cables.

6. A cable equalizing attachment for elevators, comprising a cross bar pivotally secured to the elevator, equalizing members pivotally mounted on said cross bar, and a pair of cables having their ends rigidly connected to opposite sides of said equalizing member whereby said member will act as an equalizing connection between said cables.

In witness whereof, I have hereunto affixed my signature.

JOHN W. HOBBS.